United States Patent Office 3,414,568
Patented Dec. 3, 1968

3,414,568
METHOD OF MAKING MESO-SUBSTITUTED MEROCYANINE AND CARBO-CYANINE DYES
Pierre Collet and Marcel Compere, Vincennes, France, assignors to Eastman Kodak Company, Rochester, N.Y., a corporation of New Jersey
No Drawing. Filed May 13, 1964, Ser. No. 367,247
Claims priority, application France, Dec. 9, 1963, 956,506
14 Claims. (Cl. 260—240.6)

ABSTRACT OF THE DISCLOSURE

Quaternary salts of diheteroatomic acetylenic compounds are prepared advantageously by a single step reaction of an ortho-substituted aniline with an acetylenic acid chloride, and these quaternary salts are used to advantage to make meso-substituted carbocyanine dyes and meso-substituted merocyanine dyes useful in photography.

---

This invention relates to a novel process for the direct synthesis of dye intermediates and more particularly to the direct synthesis of quaternized dye intermediates used for the synthesis of meso-substituted merocyanine and carbocyanine dyes useful for sensitizing photographic silver halide emulsions.

It is known to produce meso-substituted dyes by the condensation of two quaternary salts of heterocyclic compounds substituted in the 2-position, one by a reactive methyl or methylene group and the other by an acetylenic group, in the presence of a basic condensation agent such as triethylamine. However, up to now, only acetylenic derivatives of monoheteroatomic compounds can take advantage of this method of synthesis because diheteroatomic acetylenic compounds cannot be quaternized without the triple bond being attached.

It is, therefore, an object of our invention to provide a novel method for preparing meso-substituted dyes derived from diheteroatomic compounds.

It is another object of our invention to provide a novel method for preparing quaternary salt intermediates useful in preparing meso-substituted dyes derived from diheteroatomic compounds.

It is a further object of our invention to provide a direct method for producing quaternized diheteroatomic dye intermediates.

Still other objects will become apparent from the following specification and claims.

According to our invention, quaternary salts of diheteroatomic acetylenic compounds are prepared directly by the reaction of an ortho-substituted aniline with an acetylenic acid chloride. This quaternary salt may then be reacted with a nitrogen-containing heterocyclic compound containing a reactive methyl or methylene group to form a meso-substituted dye.

The process according to our invention comprises reacting a compound having the formula:

(I)
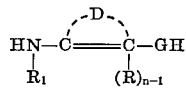

where R and $R_1$ each represents a hydrogen atom, an alkyl group, such as methyl, ethyl, propyl, isobutyl, butyl, amyl, isoamyl, carboxymethyl, β-carboxyethyl, carbethoxymethyl, β-hydroxyethyl, carbomethoxyethyl, carbomethoxymethyl, β-methoxyethyl, phenethyl, benzyl, vinylmethyl, carbamylmethyl, β-sulfoethyl, γ-sulfobutyl, etc., an aryl group, such as phenyl, tolyl, xylyl, ethylphenyl, propylphenyl, etc., G represents a member selected from the group composed of a nitrogen atom, a sulfur atom, an oxygen atom and a selenium atom, $(n-1)$ has a value of 1 when G is a nitrogen atom and $(n-1)$ has a value of 0 when G is a sulfur atom, an oxygen atom or a selenium atom, and D represents the non-metallic atoms necessary to complete an aromatic radical, such as a benzene or naphthalene nucleus, which can be substituted by alkyl groups, such as methyl, ethyl, etc., alkoxy groups, such as methoxy, ethoxy, etc., halogens such as chlorine, bromine, etc., the nitro group, the amino group, the sulfo group, etc., with a compound having the formula:

(II)
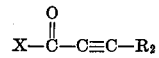

where X represents a halogen atom, such as chlorine, bromine, iodine, etc., and $R_2$ represents a member selected from the group composed of an alkyl group, such as methyl, ethyl, propyl, isobutyl, butyl, amyl, isoamyl, phenethyl, benzyl, etc., an aryl group, such as phenyl, tolyl, xylyl, ethylphenyl, propylphenyl, etc., to form a quaternary salt of diheteroatomic acetylenic compound having the formula:

(III)
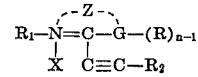

where $n$, X, R, $R_1$, $R_2$ and G are as defined previously, and Z represents the non-metallic atoms necessary to complete a heterocyclic nucleus containing two hetero-atoms and three carbon atoms in the heterocyclic ring, such as a benzothiazole nucleus (e.g., benzothiazole, 4-methylbenzothiazole, 5-methylbenzothiazole, 6-methylbenzothiazole, 4-phenylbenothiazole, 5-penylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., α-naphthothiazole (i.e., [2,1]-naphthothiazole), β-naphthothiazole (i.e., [1,2]-naphthothiazole), 5-methoxy-β-naphthothiazole, 5-ethoxy-β-naphthothiazole, 7-methoxy - α - naphthothiazole, 8 - methoxy - α - naphthothiazole, etc.), a benzoxazole nucleus (e.g., benzoxazole 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 5-hydroxybenzoxazole, 6-hydroxybenzoxazole, etc.), a naphthoxazole nucleus (e.g., α-naphthoxazole, β-naphthoxazole, etc.), a benzoselenazole nucleus (e.g., benzoselenazole, 5-methoxybenzoselenazole, 5 - hydroxybenzoselenazole, tetrahydrobenzoselenazole, etc.), a naphthoselenazole nucleus (e.g., α-naphthoselenazole, β-naphthoselenazole, etc.), a benzimidazole nucleus (e.g., benzimidazole, 1,3-diethylbenzimidazole, 1-ethyl-3-phenylbenzimidazole, 1,3-diethyl-5-ethylcarbamylbenzimidazole, 5-acetyl-1,3-diethylbenzimidazole, 5-bromo-1,3-diethylbenzimidazole, 5 - chloro-1,3-diethylbenzimidazole, etc.), a naphthimidazole nucleus (e.g., α-naphthimidazole, β-naphthimidazole, etc.).This quaternary salt of Formula III can be reacted with a nitrogen-containing heterocyclic compound containing a reactive methyl group having the formula:

(IV)
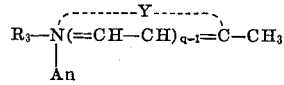

where $R_3$ may represent any of the groups defined by R and $R_1$, An represents an acid radical, such as chloride, bromide, iodide, perchlorate, thiocyanate, benzenesulfonate, p-toluenesulfonate, methylsulfonate, ethylsulfonate, etc., q represents a positive integer of from 1 to 2, and Y represents the nonmetallic atoms necessary to complete a heterocyclic nucleus containing 5 atoms in the heterocyclic ring or 6 atoms in the heterocyclic ring, such as a thiazole nucleus (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-methylbenzothiazole, 5-methylbenzothiazole, 6-methylbenzothiazole, 4-phenylbenzothiazole, 5-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, etc.), a naphthothiazole nucleus (e.g., α-naphthothiazole (i.e., [2,1] - naphthothiazole), β - naphthothiazole (i.e., [1,2]-naphthothiazole), 5-methoxy - β - naphthothiazole, 5-ethoxy - β - naphthothiazole, 7-methoxy-α-naphthothiazole, 8-methoxy - α - naphthothiazole, etc.), a thianaphtheno-7',6',4,5,-thiazole nucleus (e.g., 4' - methoxythianaphtheno - 7',6',4,5 - thiazole, etc), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 5-hydroxybenzoxazole, 6-hydroxybenzoxazole, etc.), a napthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-methoxybenzoselenazole, 5 - hydroxybenzoselenazole, tetrahydrobenzoselenazole, etc.), a naphthoselenazole nucleus (e.g., α - naphthoselenazole, β-naphthoselenazole, etc.), a thiazoline nucleus (e.g., quinoline, 3 - methylquinoline, 5 - methylquinoline, 7 - methylquinoline, 8 - methylquinoline, 6 - methoxyquinoline, 6 - ethoxyquinoline, 6 - hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a 3-isoquinoline nucleus (e.g., isoquinoline, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 3 - methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 3-hydroxypyridine, 4-hydroxypyridine, 5-hydroxypyridine, 6-hydroxypyridine, 3-phenylpyridine, 4-phenylpyridine, 6-phenylpyridine, etc.), a 4-pyridine nucleus (e.g., 2-methylpyridine, 3-methylpyridine, 2,3-dimethylpyridine, 2,5-dimethylpyridine, 2,6-dimethylpyridine, 2-hydroxypyridine, 3-hydroxypyridine, etc.), etc., in the presence of a basic condensing agent to produce a meso-substituted dye having the formula:

(V)
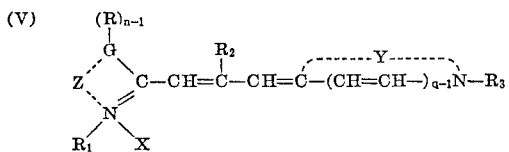

where n, q, G, X, $R_1$, $R_2$, $R_3$, Y and Z are as defined previously.

Where X in Formula II is a chlorine atom, and a bromide or iodide salt of a dye of Formula V is desired, the condensation reaction is carried out in the presence of ammonium bromide or ammonium iodide respectively, or the corresponding alkali metal bromide or iodide.

The condensations are advantageously carried out in the presence of a basic condensation agent, such as the trialkylamines (e.g. triethylamine, tri-n-propylamine, tri-isopropylamine, tri-n-butylamine, tri-isobutyl amine, tri-n-amyl-amine, etc.), the N-alkylpiperidines (e.g., N-methylpiperidine, N-ethylpiperidine, etc.), the N,N-dialkylanilines (e.g., N,N-dimethylaniline, N,N-diethylaniline, etc.), etc. The condensations can advantageously be carried out in the presence of an inert solvent, such as pyridine, lower aliphatic alcohols (e.g. ethanol, n-propanol, n-butanol, etc.) 1,4-dioxane, etc. Heat accelerates the condensations and temperatures varying from room temperature to the reflux temperature of the reaction mixture can be used.

According to a variation in the process of our invention, one can prepare meso-substituted merocyanines by reacting an intermediate compound of Formula III with a nitrogen-containing heterocyclic compound containing a reactive methylene group having the formula:

(VI)
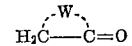

where W together with the adjacent carbon atoms represents the nonmetallic atoms required to complete a heterocyclic nucleus, such as a rhodanine nucleus, e.g., rhodanine, 3-methylrhodanine, 3-propylrhodanine, 3-amylrhodanine 3-phenylrhodanine, etc., a 2-thiazolin-4-one nucleus e.g., 2-thiazolin-4-one, 2-diphenylamino-2-thiazolin-4-one, 2 - ethylphenylamino-2-thiazolin-4-one, 2 - anilino-2-thiazolin-4-one, etc., a 2-thio-2,4-oxazolidinedione nucleus, e.g., 2-thio-2,4-oxazolidinedione, 3-ethyl-2-thio-2,4-oxazolidinedione, 3-heptyl-2-thio-2,4-oxazolidinedione, 3-phenethyl-2-thio-2,4-oxazolidinedione, etc., a hydantoin nucleus, e.g., hydantoin, 1,3-diethylhydantoin, 1-ethyl-3-phenylhydantoin, etc., a thiohydantoin nucleus, e.g., thiohydantoin, 1,3-dipropyl-2-thiohydantoin, 3-ethyl-1-phenyl-2-thiohydantoin, etc. and a 5-pyrazolone nucleus, e.g., 5-pyrazolone, 3-methyl-1-phenyl-5-pyrazolone, etc. (other nuclei include for example, those defined by Q in columns 1 and 2 of U.S. Patent 2,713,579, issued July 19, 1955), to make a meso-substituted merocyanine having the formula:

(VII)
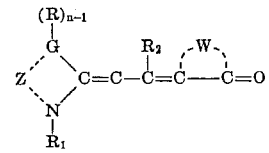

where n, G, W, Z, R, $R_1$, and $R_2$ are as defined previously.

According to our invention the quaternary salt of a diheteroatomic acetylenic compound of Formula III is produced by a single reaction step. Thus our invention solved the problem posed by the fact that diheteroatomic acetylenic compounds cannot be quaternized without the triple bond being attacked. In solving this problem, our invention provides a novel process for making dyes and novel dyes useful in photographic emulsions which were heretofore unavailable.

The reaction of the amine of Formula I with the acid chloride of Formula II to produce the quaternized salt of Formula III is exothermic and rather vigorous. The reaction, therefore, can be advantageously carried out by cooling the organic solvent solution of the amine to a convenient temperature, such as 0° C., and adding the organic solvent solution of the acid chloride slowly, such as in dropwise fashion.

The process according to the invention is used advantageously to prepare a great number of meso-substituted carbocyanine and merocyanine dyes which are useful in sensitizing silver halide photographic emulsions. The following typical representative examples will serve to illustrate the invention. However, it is to be understood that the invention is not limited by these examples.

EXAMPLE 1

Preparation of 1,3-dimethyl-2-phenethynyl benzimidazolium iodide:

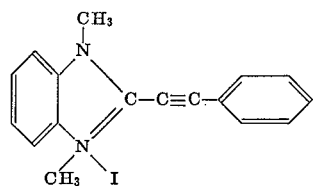

A solution of 2.72 g. (0.02 mole) of N,N'-dimethyl-o-phenylene diamine in 10 cc. of dry toluene was cooled down to 0° C. Then a solution of 3.29 g. (0.02 mole) of phenyl propiolic acid chloride in 10 cc. of dry toluene was added dropwise and the mixture maintained at 0° C. A gummy product was obtained, which was treated with 10 cc. of ethyl alcohol. A saturated solution of sodium iodide in ethyl alcohol, containing 6 g. of sodium iodide, was then added. The resulting precipitate was filtered, treated with animal black and recrystallized twice from ethyl alcohol. 3 g. of purified product were obtained, which amounts to a yield of 40%.

Analysis.—Calculated for $C_{17}H_{15}N_2I$, N, 7.50%; I, 33.96%. Found: N, 7.52%; I, 32.90%.

EXAMPLE 2

Preparation of 5-[(1,3-dimethyl benzimidazolylidene) 2'-phenyl ethylidene]3-methoxyethyl rhodanine:

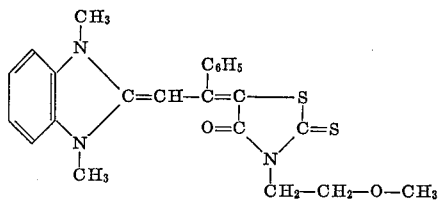

1.9 g. of the quaternary salt prepared in Example 1, 0.96 g. of omega-methoxyethyl rhodanine and 0.7 g. of triethylamine were heated to reflux in 25 cc. of ethyl alcohol. The mixture was refluxed for 15 minutes. The resulting product was cooled and filtered. It was then recrystallized twice from pyridine to give 1.2 g. of product having a melting point of 201° C. Yield=57%.

Analysis.—Calculated for $C_{23}H_{23}O_2N_3S_2$, N, 9.60%; S, 14.65%. Found: N, 10.20%; S, 14.60%.

EXAMPLE 3

Preparation of 5[(1,3-dimethyl benzimidazolylidene) 2'-phenyl ethylidene]3-ethyl-rhodanine:

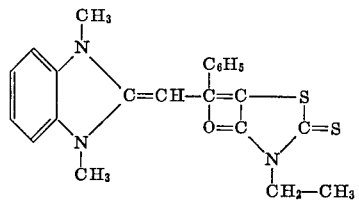

1,3-dimethyl 2-phenethynyl benzimidazolium chloride was prepared according to the procedure of Example 1, except that the step of treatment with sodium iodide was left out. 2.83 g. of the quaternary salt thus prepared, 1.61 g. of N-ethyl rhodanine and 1.10 g. of triethylamine were heated to reflux in 30 cc. of ethyl alcohol. The mixture was refluxed for 15 minutes. The resulting product was cooled and filtered. It was then recrystallized three times from ethyl alcohol to give 1.9 g. of product having a melting point of 245° C. Yield=45%.

Analysis.—Calculated for $C_{22}N_{21}ON_3S_2$, N, 10.31%. Found: N, 10.33%.

EXAMPLE 4

Preparation of 5[(1,3-dimethyl benzimidazolylidene) 2'-phenyl ethylidene]1,3-diphenyl 2-thio hydantoin:

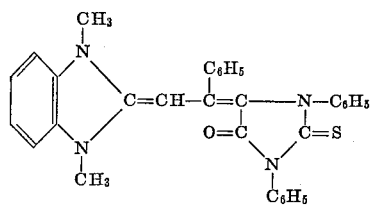

2.83 g. of 1.3-dimethyl 2-phenethynyl benzimidazolium chloride in 30 cc. of ethyl alcohol, 2.68 g. of 1,3-diphenyl 2-thio hydantoin and 1.10 g. of triethylamine were heated to reflux. The mixture was refluxed for 15 minutes and then cooled and filtered. The product was then recrystallized three times from an ethyl alcohol and pyridine mixture to give 3.8 g. of product having a melting point of 304° C. Yield=76%.

Analysis.—Calculated for $C_{32}H_{26}ON_4S$, N, 10.89%; S, 6.23%. Found: N, 10.19%; S, 5.66.

EXAMPLE 5

Preparation of 5[(1,3-dimethyl benzimidazolylidene) 2'-phenyl ethylidene]3-phenyl rhodanine:

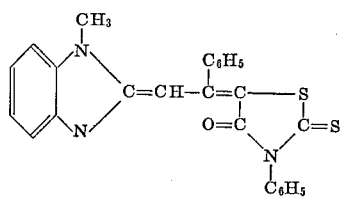

2.83 g. of 1,3-dimethyl 2-phenethylnyl benzimidazolium chloride in 30 cc. of ethyl alcohol, 2.10 g. of phenyl rhodanine and 1.10 g. of triethylamine were refluxed for 15 minutes. The product was then cooled, filtered and recrystallized twice from an ethyl alcohol and pyridine mixture. 1.9 g. of product was obtained having a melting point of 278° C. Yield=42%.

Analysis.—Calculated for $C_{26}H_{21}ON_3S_2$, N, 9.23%; S, 14.06%. Found: N, 9.63%; S, 13.70%.

EXAMPLE 6

Preparation of 5[(1,3-dimethyl benzimidazolylidene) 2'-phenyl ethylidene]1-phenyl 3-heptyl 2-thio hydantoin:

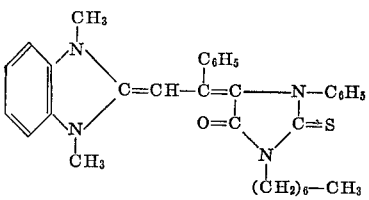

7.06 g. of 1,3-dimethyl 2-phenethynyl benzimidazolium chloride in 70 cc. of ethyl alcohol, 7.5 g. of N-heptyl-3-phenyl-2-thiohydantoin and 3.4 g. of triethylamine were refluxed for 15 minutes. After cooling and filtration, the product was recrystallized twice from ethyl alcohol. 6 g. of product were obtained having a melting point of 168° C. Yield=44%.

Analysis.—Calculated for $C_{33}H_{36}ON_4S$, C, 73.60%; S, 5.96%. Found: C, 73.46%; S, 6.06%.

EXAMPLE 7

Preparation of 1,3-dimethyl benzimidazolo-9-phenyl 1'-ethyl-2'-carbocyanine iodide:

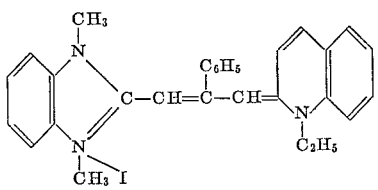

0.7 g. of the quaternary salt prepared in Example 1, 0.6 g. of quinaldine ethyliodide, 0.3 g. of triethylamine, and 20 cc. of ethyl alcohol were refluxed for 15 minutes. After cooling and filtration, the product was recrystallized twice from ethyl alcohol. The product thus obtained has a melting point of 257° C.

*Analysis.*—Calculated for $C_{29}H_{28}N_3I$, N, 7.70%; C, 63.90%. Found: N, 7.13%; C, 62.92%.

In a similar manner, other dye intermediates of formula III can be prepared from the reaction of other amines of Formula I with other acid chlorides of Formula II. Similarly, other meso-substituted merocyanines and carbocyanines of Formulae VII and V, respectively, can be prepared by the condensation of other intermediates of Formula III with other heterocyclic compounds containing reactive methylene or methyl groups of Formulae VI and IV, respectively.

Our novel synthesis is unexpected from the prior art since earlier attempts to make the quaternized salt of Formula III were unsuccessful because the diheteroatomic acetylenic compounds cannot be quaternized without the triple bond being attacked.

The novel synthesis of our invention provides a direct process for making the diheteroatomic acetylenic compounds which are valuable intermediates for preparing meso-substituted merocyanine and carbocyanine dyes used in photographic silver halide emulsions. Our process is characterized by requiring only one step, compared to two or more steps required by the prior art processes for preparing even monoheteroatomic acetylenic compounds. Our novel process produces the quaternary chlorides of the diheteroatomic acetylenic dye intermediates which were heretofore unavailable. The chloride salts of our intermediates can readily be changed to the bromide or iodide salts.

The invention has been described in detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. A single step process for preparing a quaternary salt selected from those having the following formula:

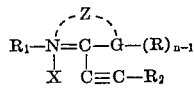

wherein R and $R_1$ each represents a member selected from the class consisting of a hydrogen atom, a lower alkyl group phenyl and an alkphenyl in which the alkyl moiety is a lower alkyl group, $R_2$ represents a member selected from the class consisting of a lower alkyl group, phenyl and an alkphenyl group in which the alkyl moiety is a lower alkyl group, X represents a halogen atom selected from the class consisting of chlorine, bromine and iodine, G represents a member selected from the class consisting of a nitrogen atom, a sulfur atom, an oxygen atom and a selenium atom, $n$ has a value of 2 when G is a nitrogen atom and $n$ has a value of 1 at all other times, Z represents the non-metallic atoms necessary to complete a heterocyclic nucleus, said heterocyclic nucleous being selected from the class consisting of a benzothiazole nucleus, a naphthothiazole nucleus, a benzoxazole nucleus, a naphthoxazole nucleus, a benzoselenazole nucleus, a naphthoselenazole nucleus, a benzimidazole nucleus and a naphthimidazole nucleus, comprising mixing a solution of a compound having the formula:

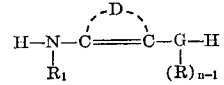

wherein $n$, R, $R_1$ and G are as defined previously, and D represents the non-metallic atoms necessary to complete an aromatic nucleus selected from the class consisting of a benzene nucleus and a naphthalene nucleus, with a compound having the formula:

$$X-\overset{O}{\underset{\|}{C}}-C\equiv C-R_2$$

wherein X and $R_2$ are as defined previously.

2. A process of claim 1 in which the quaternary salt have the following formula:

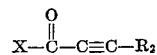

wherein X represents a halogen atom selected from the class consisting of chlorine, bromine, and iodine, R and $R_1$ each represents a member selected from the class consisting of a hydrogen atom, a lower alkyl group, phenyl and an alkphenyl group in which the alkyl moiety is a lower alkyl group, $R_2$ represents a member selected from the class consisting of a lower alkyl group, phenyl and an alkphenyl group in which the alkyl moiety is a lower alkyl group, and Z represents the non-metallic atoms necessary to complete a heterocyclic nucleus selected from the class consisting of a benzimidazole nucleus and a naphthimidazole nucleus.

3. A process of claim 1 in which the quaternary salt have the following formula:

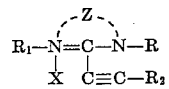

wherein X represents a halogen atom selected from the class consisting of chlorine, bromine, and iodine, $R_1$ represents a member selected from the class consisting of a hydrogen atom, a lower alkyl group and phenyl and an alkphenyl group in which the alkyl moiety is a lower alkyl group, $R_2$ represents a member selected from the class consisting of a lower alkyl group, phenyl and an alkphenyl group in which the alkyl moiety is a lower alkyl group, and Z represents the non-metallic atoms necessary to complete a heterocyclic nucleus selected from the class consisting of a benzothiazole nucleus and a naphthothiazole nucleus.

4. A process of claim 1 in which the quaternary salt have the following formula:

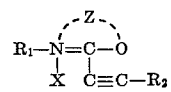

wherein X represents a halogen atom selected from the class consisting of chlorine, bromine, and iodine, $R_1$ represents a member selected from the class consisting of a hydrogen atom, a lower alkyl group and phenyl and an alkphenyl group in which the alkyl moiety is a lower alkyl group, $R_2$ represents a member selected from the class consisting of a lower alkyl group, phenyl and an alkphenyl group in which the alkyl moiety is a lower alkyl group, and Z represents the non-metallic atoms necessary to complete a heterocyclic nucleus selected from the class consisting of a benzoxazole nucleus and a naphthoxazole nucleus.

5. A process of claim 1 in which the quaternary salt have the following formula:

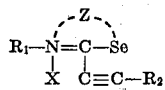

wherein X represents a halogen atom selected from the class consisting of chlorine, bromine, and iodine, $R_1$ represents a member selected from the class consisting of a hydrogen atom, a lower alkyl group, phenyl and an alkphenyl group in which the alkyl moiety is a lower alkyl group, $R_2$ represents a member selected from the class consisting of a lower alkyl group, phenyl and an alkphenyl group in which the alkyl moiety is a lower group, and Z represents the non-metallic atoms necessary to complete a heterocyclic nucleus selected from the class consisting of a benzoselenazole nucleus and a naphthoselenazole nucleus.

6. A single step process for preparing 1,3 - dimethyl-2 - phenethynyl benzimidazolium chloride comprising mixing an organic solvent solution of N,N' - dimethyl -o-phenylene diamine and a solvent solution of phenyl propioloyl chloride.

7. The meso-substituted carbocyanine dyes having the formula:

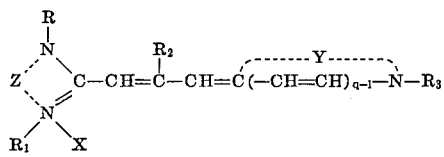

wherein X represents a halogen atom selected from the class consisting of chlorine, bromine, and iodine, q represents a positive integer of from 1 to 2, R, $R_1$ and $R_3$ each represents a member selected from the class consisting of a hydrogen atom, a lower alkyl group, phenyl, and an alkylphenyl group in which the alkyl moiety is a lower alkyl group, $R_2$ represents a member selected from the class consisting of a lower alkyl group, phenyl and an alkphenyl group in which the alkyl moiety is a lower alkyl group, Z represents the non-metallic atoms necessary to complete a heterocyclic nucleus selected from the class consisting of a benzimidazole nucleus and a naphthimidazole nucleus, and Y represents the non-metallic atoms necessary to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 1-isoquinoline nucleus, a 3-isoquinoline nucleus, a 3,3-dialkylimidolenine nucleus, a 2-pyridine nucleus and a 4-pyridine nucleus.

8. 1,3-dimethyl benzimidazolo-9-phenyl 1'-ethyl 2'-carbocyanine iodide.

9. A compound of the following formula:

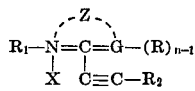

wherein R and $R_1$ each represents a member selected from the class consisting of a hydrogen atom, a lower alkyl group, phenyl and an alkylphenyl group in which the alkyl moiety is a lower alkyl group, $R_2$ represents a member selected from the class consisting of a lower alkyl group, phenyl and an alkphenyl group in which the alkyl moiety is a lower alkyl group, X represents a halogen atom selected from the class consisting of chlorine, bromine and iodine, G represents a member selected from the class consisting of a nitrogen atom, a sulfur atom, an oxygen atom and a selenium atom, n has a value of 2 when G is a nitrogen atom and n has a value of 1 at all other times, Z represents the non-metallic atoms necessary to complete a heterocyclic nucleus, said heterocyclic nucleus, being selected from the class consisting of a benzothiazole nucleus, a naphthothiazole nucleus, a benzoxazole nucleus, a naphthoxazole nucleus, a benzoselenazole nucleus, a naphthoselenazole nucleus, a benzimidazole nucleus and a naphthimidazole nucleus.

10. A compound of the following formula:

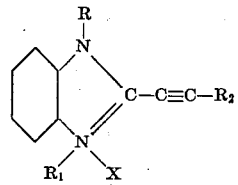

wherein X represents a halogen atom selected from the class consisting of chlorine, bromine, and iodine, R and $R_1$ each represents a member selected from the class consisting of a hydrogen atom, a lower alkyl group, phenyl and an alkphenyl group in which the alkyl moiety is a lower alkyl group, and $R_2$ represents a member selected from the class consisting of a lower alkyl group, phenyl and an alkphenyl group in which the alkyl moiety is a lower alkyl group.

11. A compound of the following formula:

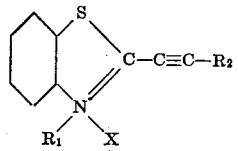

wherein X represents a halogen atom selected from the class consisting of chlorine, bromine, and iodine, $R_1$ represents a member selected from the class consisting of a hydrogen atom, a lower alkyl group, phenyl and an alkphenyl group in which the alkyl moiety is a lower alkyl group, and $R_2$ represents a member selected from the class consisting of a lower alkyl group, phenyl and an alkphenyl group in which the alkyl moiety is a lower alkyl group.

12. A compound of the following formula:

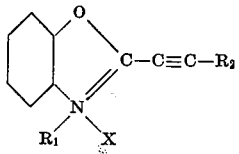

wherein X represents a halogen atom selected from the class consisting of chlorine, bromine, and iodine, $R_1$ represents a member selected from the class consisting a hydrogen atom, a lower alkyl group, phenyl and an alkphenyl group in which the alkyl moiety is a lower alkyl group, and $R_2$ represents a member selected from the class consisting of a lower alkyl group, phenyl and an alkphenyl group in which the alkyl moiety is a lower alkyl group.

13. A compound of the following formula:

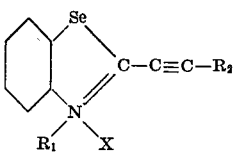

wherein X represents a halogen atom selected from the class consisting of chlorine, bromine, and iodine, $R_1$ represents a member selected from the class consisting of a hydrogen atom, a lower alkyl group, and phenyl and an alkphenyl group in which the alkyl moiety is a lower alkyl group, and $R_2$ represents a member selected from the class consisting of a lower alkyl group, phenyl and an alkphenyl group in which the alkyl moiety is a lower alkyl group.

14. 1,3-dimethyl-2-phenethynyl benzimidazolium chloride.

References Cited

UNITED STATES PATENTS 2,548,571  4/1951  Van Lore et al. ____ 260—240.4

FOREIGN PATENTS 910,199  7/1949  Germany.

OTHER REFERENCES

Chemical Abstract, vol. 54, cols. 8817–8818 (1960).
Chemical Abstract, vol. 55, cols. 22833–22834 (1961).
Neunhoeffer et al., Chem. Ber., vol. 92, pp. 791–793 (1959).
Chemisches Zentralblatt, vol. 132, pp. 15265–15266 (1961).

JOHN D. RANDOLPH, *Primary Examiner.*

UNITED STATES PATENT OFFICE
CERTIFICATE OF CORRECTION

Patent No. 3,414,568                                             December 3, 1968

Pierre Collet et al.

It is certified that error appears in the above identified patent and that said Letters Patent are hereby corrected as shown below:

Column 8, line 16, after the word "with" insert -- a solution of --. Column 9, line 14, after the word "lower" insert -- alkyl --; lines 59 through 62, in the structural formula, that portion of the structure that reads $$=\overset{|}{\underset{|}{C}}=\overset{}{G}-\qquad \text{should read} \qquad =\overset{|}{C}-\overset{|}{\underset{|}{G}}-$$

Column 10, line 52, after the last word "consisting" insert -- of --.

Signed and sealed this 3rd day of February 1970.

(SEAL)
Attest:

EDWARD M. FLETCHER, JR.                          WILLIAM E. SCHUYLER, JR.
Attesting Officer                                         Commissioner of Patents